United States Patent [19]

Lunev et al.

[11] 4,301,680
[45] Nov. 24, 1981

[54] APPARATUS AND SYSTEM FOR MEASURING POWER OF HEAT RADIATION

[76] Inventors: Evgeny I. Lunev, ulitsa Shkolnaya, 11, kv. 56, Moskovskaya oblast, Troitsk; Alexandr P. Leonov, 19, kv. 37, Moskovskaya oblast, Mosrentgen; Nina P. Kosyreva; Felix K. Kosyrev, both of ulitsa Tsentralnaya, 14, kv. 27, Moskovskaya oblast, Troitsk; Valery A. Timofeev, ulitsa Zavodskaya, 9/1, kv. 14; Anatoly K. Pekh, ulitsa Fevralskaya, 6, kv. 6, both of Moskovskaya oblast, Klimovsk; Alexei S. Kononykhin, ulitsa Akademicheskaya, 9, kv. 304; Alexei V. Artamonov, ulitsa Lesnaya, 5, kv. 13, both of Moskovskaya oblast, Troitsk, all of U.S.S.R.

[21] Appl. No.: 965,877

[22] Filed: Dec. 4, 1978

[51] Int. Cl.³ .................... G01K 17/00; G01J 5/20
[52] U.S. Cl. .................................................. 73/190 EW
[58] Field of Search .............. 73/190 EW, 355 R; 250/346, 352

[56] References Cited

U.S. PATENT DOCUMENTS

| 2,785,860 | 3/1957 | Harrison et al. | 73/355 X |
| 3,101,618 | 8/1963 | Hance | 73/355 X |
| 3,267,727 | 8/1966 | Benzinger | 73/190 |
| 3,282,100 | 11/1966 | Baker | 73/190 |
| 3,561,265 | 2/1971 | Schmidt | 73/190 |
| 3,596,514 | 8/1971 | Mefferd et al. | 73/190 |

FOREIGN PATENT DOCUMENTS

| 2396349 | 6/1977 | France | 73/190 |
| 271075 | 5/1970 | U.S.S.R. | 73/190 |

*Primary Examiner*—Herbert Goldstein
*Attorney, Agent, or Firm*—Burton L. Lilling

[57] ABSTRACT

An apparatus for measuring the power of heat radiation, comprising a sensitive element implemented, for example, as an electrically conductive filament adapted to be displaced in a heat radiation flux at a stabilized speed. Connected to the sensitive element is a meter for registering the variations of the temperature of the sensitive element, resulted from the heat radiation.

A system for measuring the power of a heat radiation, comprising at least three such apparatuses.

19 Claims, 14 Drawing Figures

APPARATUS AND SYSTEM FOR MEASURING POWER OF HEAT RADIATION

FIELD OF THE INVENTION

This invention relates to measurement engineering, and more particularly to apparatuses for measuring the power of a heat radiation and systems based on such apparatuses.

The invention is suitable for use in such branches of economy which are concerned with the measurement of the temperature of flame jets, plasma fluxes, gaseous and liquid jets and with the measurement of the power of laser radiation as well.

DESCRIPTION OF THE PRIOR ART

At present, there are a number of production processes dealing with laser beams used for welding, cutting, thermal treatment and so on. To effect these processes adequately, it is necessary in many cases to determine precisely the amount of the power of the laser beam, which requires, in turn, that the power of the laser radiation be controlled without interruption of the laser beam.

Known in the art is a device for measuring the power of a heat radiation (cf. U.S. Pat. No. 3,282,100, cl. 73-190, 1966), which device comprises a sensitive element introduced in a heat radiation flux and connected to a meter for registering the variations of the temperature of the sensitive element, resulted from the heat radiation. The sensitive element of the device is implemented as a mass of tangled electrically conductive filament which is fixed immovably and is irradiated by a heat radiation flux obtainable, for example, from a laser beam.

The known device is disadvantageous in that the measurement of the power of the laser beam is accompanied by a complete interruption of the latter, a feature not permissible in many cases due to the fact that the production process is to be stopped during the measurement.

In addition, the device can measure laser beams of a low power only since the filament is subject to overheat with the result that the sensitive element fails to operate.

Moreover, external conditions such as currents of air or ingress of dirt give influence on the sensitive element, thereby resulting in reduced measurement accuracy and low effectiveness of the known device.

Finally, the device cannot determine the distribution of the density of the power of a heat radiation in the cross-section of the laser beam.

SUMMARY OF THE INVENTION

An object of the invention is to provide for improved checking of the production processes utilizing heat radiation techniques.

Another object of the invention is to provide an apparatus for measuring the power of a heat radiation with greater accuracy.

Still another object of the invention is to provide an apparatus for measuring the power of a heat radiation having greater reliability.

A yet another object of the invention is to provide for measuring the power of a heat radiation in a continuous mode.

There is provided an apparatus for measuring the power of a heat radiation, comprising a sensitive element disposed in a heat radiation flux and connected to a meter for registering the variation of the temperature of the sensitive element, resulted from the heat radiation, the sensitive element being allowed, according to the invention, to be displaced relative to the heat radiation flux at a stabilized speed.

Preferably, an apparatus for measuring the power of a heat radiation comprises a drive means with an output shaft having an axis of revolution disposed in a lateral or a longitudinal relation to the heat radiation flux, the sensitive element being disposed on the drive means.

Advantageously, an apparatus for measuring the power of a heat radiation comprises a main disc mounting the sensitive element and installed on the output shaft of the drive means at right angles to the axis of revolution of the shaft.

Preferably, an apparatus for measuring the power of a heat radiation comprises a sensitive element implemented as an electrically conductive filament bent in a wavelike fashion in the plane of revolution of the main disc and disposed in a fixed relation to the periphery of the latter.

Advantageously, in an apparatus for measuring the power of a heat radiation there is a tubing adapted to contain the heat radiation flux in the case where the axis of revolution of the output shaft of the drive means is arranged in a lateral relation to the heat radiation flux, the tubing mounting an element allowed to be rotated relative to the latter, and a bracket being rigidly coupled with the element and the drive means.

Preferably, in an apparatus for measuring the power of a heat radiation, in the case where the axis of revolution of the output shaft of the drive means is arranged in a lateral relation to the heat radiation flux, there is an additional disc disposed on the output shaft in a parallel relation to the main disc, a distance between the main disc and the additional disc being selected to be more than the cross-section of the heat radiation flux.

Advantageously, an apparatus for measuring the power of a heat radiation comprises a sensitive element implemented as an electrically conductive filament arranged in a tense zigzaglike fashion between the main and the additional disc.

Preferably, the main disc and the additional disc are made each of a dielectric material.

Advantageously, an apparatus for measuring the power of a heat radiation comprises, in the case where the axis of revolution of the output shaft of the drive means is arrange in a longitudinal relation to the heat radiation flux, a sensitive element implemented in the form of at least one strip made of a material which tends to vary its linear dimensions with temperature, the width of the strip being selected to be less than the cross-section of the heat radiation flux, the length of the strip being selected to be more than the cross-section of the heat radiation flux, the strip having its plane disposed at right angles to the axis of revolution of the output shaft of the drive means, and the meter for registering the variations of the temperature of the sensitive element resulted from the heat radiation being implemented as a linear displacement pickup that measures a deformation of the strip along the axis of revolution of the output shaft.

Preferably, in an apparatus for measuring the power of heat radiation the strip is made of a bimetallic material.

Advantageously, an apparatus for measuring the power of heat radiation in which, in the case where the sensitive element is implemented as a single strip, the latter is affixed to the output shaft of the drive means by virtue of a clamp rigidly attached to the output shaft in a manner that the ends of the strip are attached to the clamp and the mid portion of the strip, which is the center of revolution of the latter, is kept in contact with an input of the linear displacement pickup, the strip providing a thermal shield for the clamp so that the heat radiation flux does not impinge on the latter.

Preferably, apparatus for measuring the power of a heat radiation in which, in the case where the sensitive element is implemented as a strip or a plurality of strips, the strip(s) each having one end connected with the output shaft of the drive means, the linear displacement pickup having a mirror member attached to the other end of a respective strip and irradiated by a light beam from a light source, and having a readout scale inserted in the path of a reflected light beam.

Advantageously, an apparatus for measuring the power of a heat radiation in which the mirror element is implemented as a polished flat portion on the other end of a respective strip.

Preferably, a system for measuring the power of a heat radiation comprises at least three apparatuses for measuring the power of a heat radiation, according to the invention, which system can determine the distribution of the density of the power of heat radiation across the heat flow.

The instant invention provides for a continuous operating mode of the proposed apparatus.

With the invention, the time during which the sensitive element is held within the zone of the heat radiation is reduced and the sensitive element is cooled more effectively with the result that the reliability of the proposed apparatus is increased.

In the proposed apparatus, the speed of rotation of the sensitive element is selected so that the currents of air and variations of the ambient temperature at the place of installation of the apparatus do not affect the measurement accuracy.

The speed of rotation of the sensitive element can be varied and the power of the heat radiation can therefore be measured within wide limits.

DESCRIPTION OF THE DRAWINGS

The invention will now be described, by way of example, with reference to the accompanying drawings, in which.

Description of the Invention

The apparatus for measuring the power of a heat radiation, according to the invention, comprises a drive means (FIG. 1) with an output shaft 2 having an axis of revolution 3 disposed in a lateral relation to heat radiation flux 4. In the described embodiment, a main disc 5 is mounted on the output shaft 2 at right angles to the axis of revolution 3, the main disc 5 being made of a dielectric material. Introduced in the heat radiation flux 4 is a sensitive element implemented, according to the given embodiment, in the form of an electrically conductive filament 6 (FIG. 1,2) which is bent in a wavelike fashion in the plane of revolution of the main disc 5 (FIG. 2) and is disposed in a fixed relation relative to the periphery of the latter. The apparatus also comprises a meter 7 for registering the variation of the temperature of the sensitive element, resulting from the heat radiation, and the inputs of the meter 7 connect to ends 9 of the filament 6 through slip rings 8.

Figure 1:
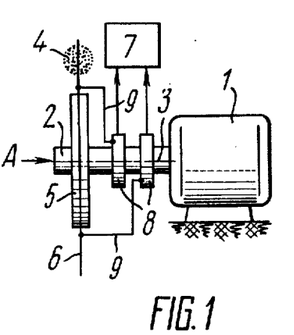
FIG. 1 is a general diagrammatic representation of an apparatus for measuring the power of a heat radiation with a main disc and a sensitive element in the form of an electrically conductive filament, the axis of revolution of the output shaft of a drive means mounting the main disc being disposed in a lateral relation to the heat radiation flux, according to the invention.
Figure 2:
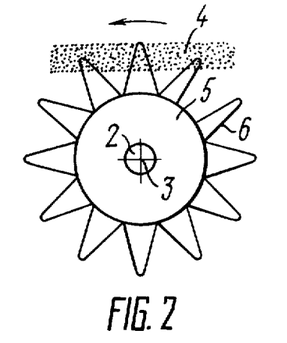
FIG. 2 is a view in the direction of arrow A of FIG. 1, according to the invention.
Figure 3:
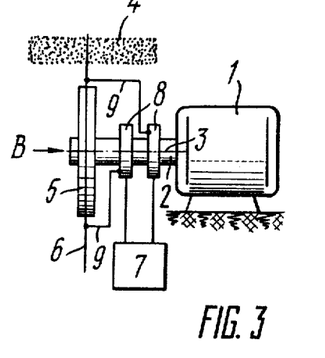
FIG. 3 shows an embodiment of the apparatus of FIG. 1 in which the axis of revolution of the output shaft of the drive means is located in a longitudinal relation to the heat radiation flux, according to the invention.
Figure 4:
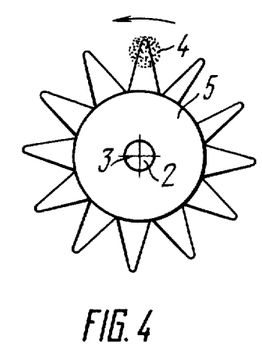
FIG. 4 is a view in the direction of arrow B of FIG. 3, according to the invention.

FIGS. 3 and 4 illustrate an embodiment of the apparatus of the invention analagous to that shown in FIGS. 1 and 2 with the exception that the axis of revolution 3 of the output shaft 2 of the drive means 1 is located in a longitudinal relation to the heat radiation flux 4.

Figure 5:
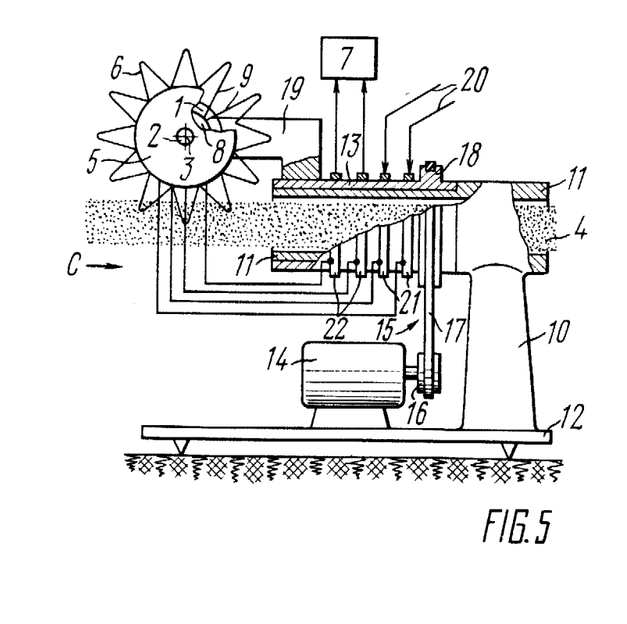
FIG. 5 shows an embodiment of the apparatus of FIG. 1 having a tubing in which the heat radiation flux is contained and about which an element connected with the drive means is rotated.
Figure 6:
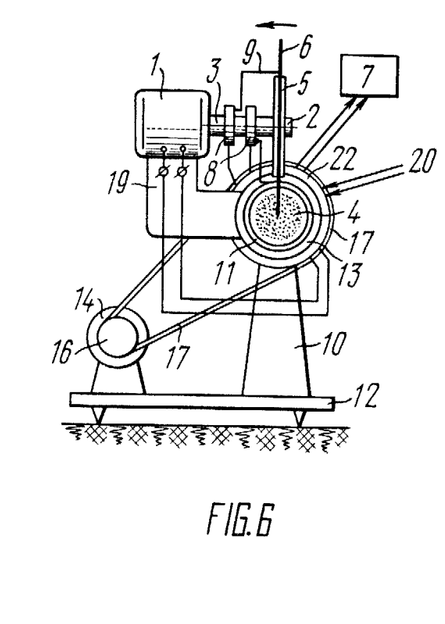
FIG. 6 is a view in the direction of arrow C of FIG. 5, according to the invention.

In another embodiment the apparatus of the invention comprises a tubing 11 (FIG. 5) attached to a prop 10 and containing the heat radiation flux 4. The prop 10 is affixed to a base plate 12. An element 13 is the form of a ring (hereinafter referred to as a ring 13) is mounted on the tubing 11 and is allowed to be rotated about the latter. The ring 13 is coupled with an electric motor 14 on the base plate 12 by virtue of a belt transmission 15. The latter comprises a drive pulley 16, a transmission rope 17 and a driven pulley 18. The ring 13 and the drive means 1 are rigidly coupled with each other by virtue of a bracket 19 (FIGS. 5,6) and the axis of revolution of the output shaft 2 is disposed in a lateral relation to the heat radiation flux 4. The drive means 1 is connected to outputs 20 of a power supply (not shown in the drawing) by means of slip rings 21 (FIG. 5) mounted on the ring 13. The slip rings 8 (FIGS. 5,6) are connected to the inputs of the meter 7 by means of another pair of slip rings 22 mounted on the ring 13.

Figure 7:
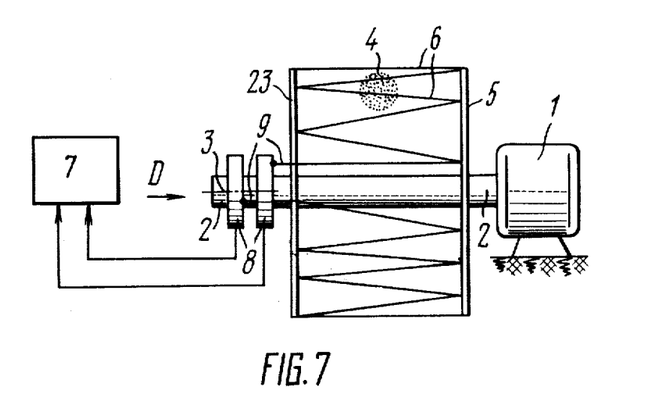
FIG. 7 shows an embodiment of the apparatus of FIG. 1 having an additional disc, according to the invention.
Figure 8:
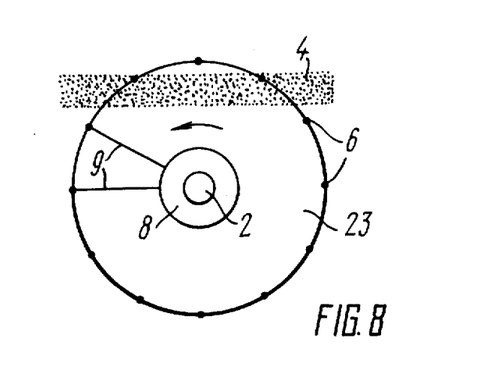
FIG. 8 is a view in the direction of arrow D of FIG. 7, according to the invention.

A still another embodiment of the apparatus of the invention comprises an additional disc 23 (FIGS. 7,8) attached to the output shaft 2 in a parallel relation to the main disc 5. The additional disc 23 is made of dielectric material. The distance between the main disc 5 and the additional disc 23 (FIG. 7) must exceed the cross-section of the heat radiation flux 4. In this embodiment the sensitive element is implemented as an electrically conductive filament 6 which is stretched tight in a zigzag-like fashion between the disc 5 and 23 (FIG. 7) and is fixed over the peripheries of the discs. As to the remaining features, the embodiment is analogous to that shown in FIG. 3.

Figure 9:
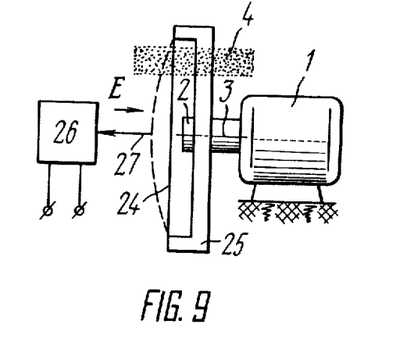
FIG. 9 is a general diagrammatic representation of an apparatus for measuring the power of heat radiation in which the sensitive element is implemented as a strip attached to a clamp, according to the invention.
Figure 10:
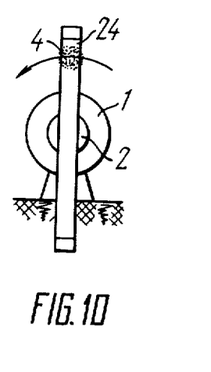
FIG. 10 is a view in the direction of arrow E of FIG. 9, according to the invention.

Yet another embodiment of the apparatus of the invention deals with a sensitive element implemented in the form of a strip 24 (FIGS. 9,10) made of a bimetallic material. The width of the strip 24 (FIG. 10) must be less than the cross-section of the heat radiation flux 4, while the length of the strip 24 must be more than the cross-section of the heat radiation flux 4. The apparatus of this embodiment comprises a clamp 25 (FIG. 9) mounted on the output shaft 2. The ends of the strip 24 are attached to the ends of the clamp 25 so that the former protects the clamp 25 from the heat radiation flux 4. The meter 7 (FIGS. 3,5,6, 7) is a conventional linear displacement pickup 26 (FIG. 9) having an input 27 brought into a contact with the mid portion of the strip 24, which is the center of revolution of the latter.

In another embodiment of the apparatus of the invention, the sensitive element comprises two strips 28, 29 (FIGS. 11, 12) each having one end attached to the output shaft 2 so that the plane of each of the strips 28, 29 is disposed at right angles to the heat radiation flux 4.

Figure 11:
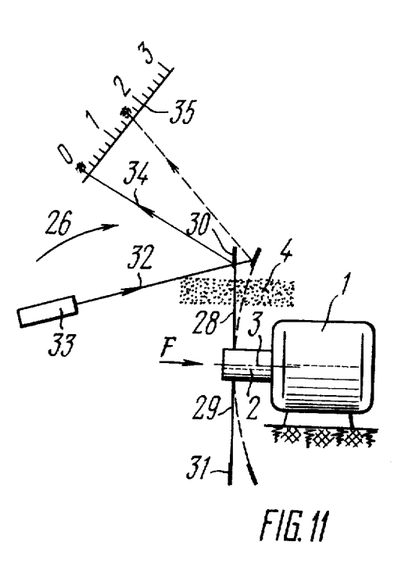
FIG. 11 shows the embodiment of FIG. 9 in which the strip has one end attached to the output shaft of the drive means, according to the invention.
Figure 12:
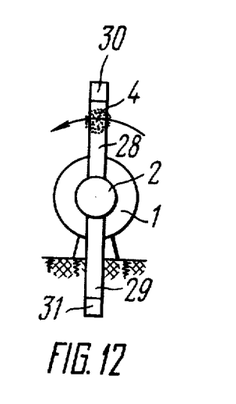
FIG. 12 is a view in the direction of arrow F of FIG. 10, according to the invention.

The linear displacement pickup 26 comprises mirror members 30,31 attached to the other ends of respective strips 28, 29. As the output shaft 2 rotates, a light beam 32 from a light source 33 impinges alternately on the mirror members 30, 31, for example, on the mirror member 30. A readout scale 35 is inserted in the path of a reflected light beam 34.

Figure 13:
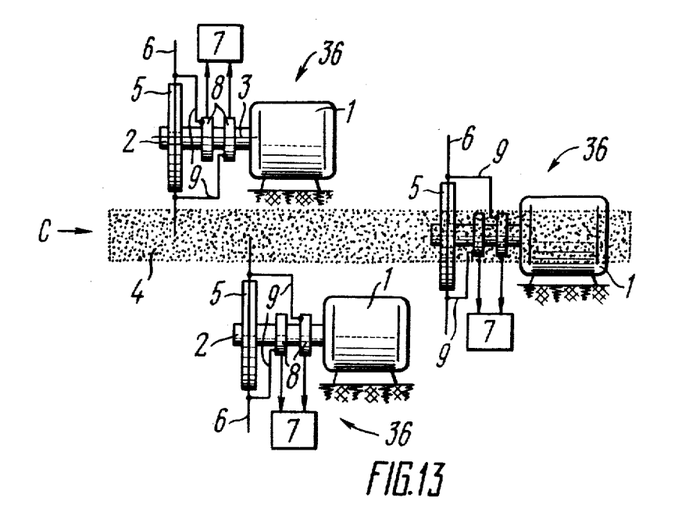
FIG. 13 is a general diagrammatic representation of a system for measuring the power of a heat radiation, based on three apparatuses of FIG. 3, according to the invention.
Figure 14:
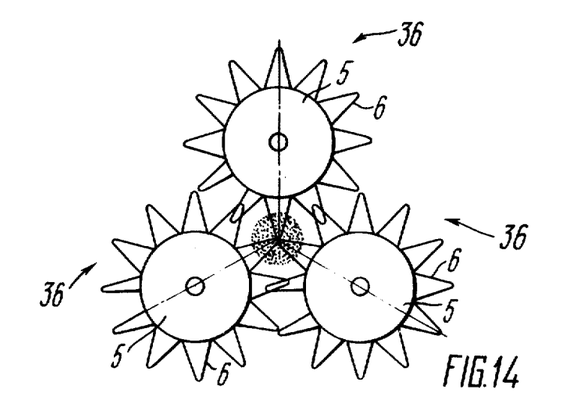
FIG. 14 is a view in the direction of arrow G of FIG. 13, according to the invention.

According to the invention there is provided a system (FIG. 13) for measuring the power of a heat radiation, based on three apparatuses 36 of FIG. 3. The apparatuses 36 (FIGS. 13, 14) are located at 120° to one another so that their electrically conductive filaments 6 tends to overlap the cross-section of the heat radiation flux 4.

The apparatus of the invention operates in the following manner. The sensitive element introduced in a heat radiation flux absorbs a portion of the heat energy thereof with the result that the temperature of the sensitive element is increased. The latter rotates at a stabilized speed and its temperature is therefore maintained at a preset level.

In the case where the sensitive element is an electrically conductive filament 6 (FIG. 1), the ends 9 of the latter are connected to the meter 7 calibrated in terms of the power of heat radiation and adapted to measure the variations of the resistance of the filament 6.

In the case where the filament 6 (FIGS. 1,2) is fixed over the periphery of the main disc 5 and the axis of revolution 3 of the output shaft 2 of the drive means 1 is located in a lateral relation to the heat radiation flux 4, the apparatus of the invention measures the power of the latter so that an even distribution of the density of the power over the cross-section of the heat radiation flux 4 is obtained.

In the case where the axis of revolution 3 (FIGS. 3,4) is located in a longitudinal relation to the heat radiation flux 4, the apparatus of the invention measures the total power of the heat radiation flux 4.

The two embodiments are advantageous in that an increase in the number of revolutions of the output shaft 2, at a minimal magnitude of the heat radiation flux 4 (FIGS. 1, 2,3,4), makes the wave sections of the filament 6 more stable due to the fact that the stacking plane of the wave section of the filament 6 coincides with the plane in which the external forces tend to act which are centrifucal ones in nature.

Such an optimum configuration allows for the use of the filament 6 having a minimum cross-section with the result that the delay property of the apparatus is kept at a minimum.

In the case where the drive means 1 is joined rigidly, by virtue of the bracket 19 (FIGS. 5,6), with the ring 13 mounted on the tubing 11, the filament 6 is allowed to be rotated additionally about the heat radiation flux 4 continued in the tubing 11. In this case, the apparatus of the invention measures a spatial distribution of the power of heat radiation in any of the sections through the heat radiation flux 4.

In the case where the filament 6 (FIGS. 7,8) is stretched tight in a zigzaglike fashion between the discs 5 and 23, the apparatus of the invention measures the total power of the heat radiation flux 4.

In the case where the sensitive element is made in the form of the strip 24 (FIGS. 9,10) or two strips 28, 29 (FIGS. 11,12), the meter 7 is the linear displacement pickup 26 calibrated in terms of the power of heat radiation.

When activated by a heat radiation, the strip 24 (FIGS. 9,10) or the strips 28, 29 (FIGS. 11,12) are subject to a deformation whose magnitude, after a proper calibration, is representative of the power of the heat radiation flux 4.

The mid portion of the strip 24 (FIGS. 9,10) having its ends attached to the clamp 25 is in direct contact with the input 27 of the pickup 26 which measures the deformation magnitude.

The heat radiation flux 4 passes through the strips 28, 29 (FIGS. 11,12) and the latter are subject to a deformation with the result that the position of the mirror members 30, 31 is changed relative to a rather narrow light beam 32. This causes a change in the position of the reflected light beam 34 and the change is read against the readout scale 35 of the pickup 26.

A polished flat portion (not shown in the drawing) can be used instead of any of the mirror members 30, 31, said flat portion being implemented on each of the other ends of the strips 28, 29.

To determine the position of the power peak of the head radiation flux 4, a system incorporating three apparatuses 36 (FIGS. 13, 14) is used. The relative positions of the apparatuses 36 at 120° to one another allows for concurrent determination of the total power and the position of the power peak in any cross-section of the heat radiation flux 4.

The instant invention features high technicoeconomical characteristics since the power of a heat radiation can be measured in a wide range without introducing any construction modifications in the apparatus of the invention; in addition, the apparatus of the invention utilizes mass-production instruments and materials.

The invention is also advantageous in that its apparatuses, if failed, can be replaced easily. Since the apparatus of the invention has small dimensions, it can be installed at any desirable point of a heat radiation flux under measurement; this feature also provides for improved operational qualities and reduced fabrication cost.

What is claimed is:

1. An apparatus for measuring the power of heat radiation, comprising:
   a sensitive element including an electrically conductive filament having a zig-zag or wave-like configuration and arranged in relation to the heat radiation flux for exposure of only successive portions of said filament to said heat radiation flux upon displacement relative to the latter; and
   a meter for registering the variations of the temperature of said electrically conductive filament resulting from the heat radiation.

2. An apparatus as claimed in claim 1, comprising a drive means with an output shaft whose axis of revolution is disposed in a lateral or a longitudinal relation to said heat radiation flux, said electrically conductive filament being disposed on said output shaft.

3. An apparatus as claimed in claim 2, comprising a first disc mounting said electrically conductive filament and installed on said output shaft of said drive means at right angles to said axis of revolution of said output shaft.

4. An apparatus as claimed in claim 3 in which said sensitive element is an electrically conductive filament bent in a wavelike fashion in the plane of revolution of said first disc and disposed in a fixed relation to the periphery of the latter.

5. An apparatus as claimed in claim 4, comprising in the case where said axis of revolution of said output shaft of said drive means is located in a lateral relation to said heat radiation flux;
   a tubing containing said heat radiation flux;
   an element mounted on said tubing and allowed to be rotated relative to the latter;
   a bracket rigidly coupled with said element and said drive means.

6. An apparatus as claimed in claim 4 in which said first disc is made of a dielectric material.

7. An apparatus as claimed in claim 3 comprising in the case where said axis of revolution of said output shaft of said drive means is disposed in a lateral relation to said heat radiation flux:
   a tubing containing said heat radiation flux;
   an element mounted on said tubing and allowed to be rotated relative to the latter;
   a bracket rigidly coupled with said element and said drive means.

8. An apparatus as claimed in claim 2, comprising in the case where said axis of revolution of said output shaft of said drive means is disposed in a lateral relation to said heat radiation flux:
   a tubing containing said heat radiation flux;
   an element mounted on said tubing and allowed to be rotated relative to the latter;
   a bracket rigidly coupled with said element and said drive means.

9. An apparatus as claimed in claim 8 in which said first and second discs are made each of a dielectric material.

10. An apparatus as in claim 1 further comprising a system for measuring the power of a heat radiation including at least three of said apparatuses for measuring the power of a heat radiation, said apparatuses being located at 120° to one another.

11. A system as claimed in claim 10 in which each of said apparatuses for measuring the power of a heat radiation includes a drive means with an output shaft whose axis of revolution is located in a longitudinal relation to said heat radiation flux, said output shaft mounting said sensitive element.

12. A system as claimed in claim 10 in which each of said apparatuses for measuring the power of a heat radiation includes a first disc mounting said sensitive element and installed on said output shaft of said drive means at right angle to said axis of revolution.

13. A system as claimed in claim 12 in which each of said apparatuses for measuring the power of a heat radiation is made as an electrically conductive filament bent in a wavelike fashion in the plane of revolution of said first disc and arranged in a fixed relation to its periphery.

14. An apparatus for measuring the power of heat radiation, comprising:
   a sensitive element including an electrically conductive filament disposed in a heat radiation flux for displacement relative to the latter;
   a meter for registering the variations of the temperature of said electrically conductive filament resulting from the heat radiation;
   a drive means with an output shaft whose axis of revolution is disposed in a lateral or a longitudinal relation to said heat radiation flux, said electrically conductive filament being disposed on said output shaft; and
   first and second discs installed on said output shaft in a parallel relationship, the distance between said first and second discs being selected to be more than the cross-section of said heat radiation flux, said electrically conductive filament being mounted on said discs and being arranged in a tense zig-zag-like fashion between said first and second discs.

15. An apparatus as claimed in claim 14 in which said first and second discs are made each of a dielectric material.

16. An apparatus for measuring the power of heat radiation, comprising:
   a sensitive element including an electrically conductive filament disposed in a heat radiation flux for displacement relative to the latter;
   a meter for registering the variations of the temperature of said electrically conductive filament resulting from the heat radiation;
   a drive means with an output shaft whose axis of revolution is disposed in a lateral or a longitudinal relation to said heat radiation flux, said electrically conductive filament being disposed on said output shaft; and
   first and second discs installed on said output shaft in a parallel relationship, the distance between said first and second discs being selected to be more than the cross-section of said heat radiation flux, said first and second discs being made each of a dielectric material and said electrically conductive filament extending between said parallel discs.

17. An apparatus for measuring the power of heat radiation, comprising:
   a sensitive element including an electrically conductive filament disposed in a heat radiation flux for displacement relative to the latter;

a meter for registering the variations of the temperature of said electrically conductive filament resulting from the heat radiation;

drive means with an output shaft whose axis of revolution is disposed in a lateral or a longitudinal relation to said heat radiation flux, said electrically conductive filament being disposed on said output shaft; and first and second discs installed on said output shaft in a parallel relationship and mounting said electrically conductive filament, the distance between said first and second discs being selected to be more than the cross-section of said heat radiation flux.

18. An apparatus for measuring the power of heat radiation, comprising:

a sensitive element including an electrically conductive filament disposed in a heat radiation flux for displacement relative to the latter;

a meter for registering the variations of the temperature of said electrically conductive filament resulting from the heat radiation;

drive means with an output shaft whose axis of revolution is disposed in a lateral or a longitudinal relation to said heat radiation flux, said electrically conductive filament being disposed on said output shaft;

a first disc mounting said electrically conductive filament and installed on said output shaft of said drive means at right angles to said axis of revolution of said output shaft; wherein said axis of revolution of said output shaft of said drive means being disposed in a lateral relation to said heat radiation flux and first and second discs installed on said output shaft in a parallel relationship and mounting said electrically conductive filament, the distance between said first and second discs being selected to be more than the cross-section of said heat radiation flux.

19. An apparatus as claimed in claim 18 in which said first and second discs are made each of a dielectric material.

* * * * *